E. L. COX.
ARTIFICIAL BAIT.
APPLICATION FILED DEC. 22, 1915.
Reissued Oct. 16, 1917. 14,377.
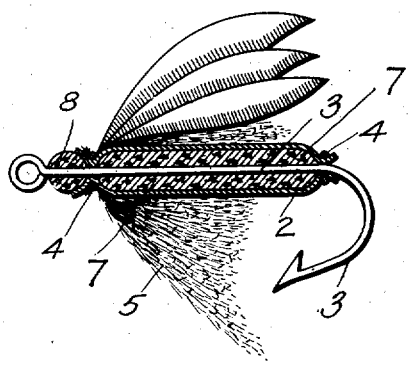
WITNESSES:
F. H. Cuno.
L. Rhodes
INVENTOR.
EDWARD L. COX.
BY
J. J. Dallamici
ATTORNEY.

UNITED STATES PATENT OFFICE.

EDWARD LAFAYETTE COX, OF DENVER, COLORADO, ASSIGNOR TO THE WHITNEY SPORTING GOODS COMPANY, A CORPORATION OF COLORADO.

ARTIFICIAL BAIT.

14,377. Specification of Reissued Letters Patent. Reissued Oct. 16, 1917.

Original No. 975,833, dated November 15, 1910, Serial No. 486,371, filed March 29, 1909. Application for reissue filed December 22, 1915. Serial No. 68,273.

*To all whom it may concern:*

Be it known that I, EDWARD LAFAYETTE COX, a citizen of the United States, and a resident of Denver, in the county of Denver and State of Colorado, have invented a new and Improved Artificial Bait, of which the following is a full, clear, and exact description.

The invention relates to artificial fish bait of the type in which a hook is concealed by a body, feathers and other light material formed and relatively arranged to simulate a winged insect.

It is well known that insects on which fish in shallow streams feed, light upon the surface of the water to become a prey for the fish inhabiting the streams.

In most all the artificial bait of the type mentioned, at present in use, the non-metallic parts after having been in the water for a short time become water-soaked and thus add to the weight of the metal hook sufficiently to cause it to sink below the surface of the water.

To catch certain kinds of fish, such as the trout which inhabit the mountain streams of Colorado and other Western States, the bait after it has sunk below the surface of the water is ineffective, and the fisherman in order to attract the fish must repeatedly pull the bait out of the water and cast it upon the surface of the same at different places.

It is the primary object of the present invention to provide an artificial bait made in imitation of a winged insect which floats permanently and naturally upon the surface of the water and thus resembles the insects in action as well as in appearance.

Another object of the invention is to provide a bait of this character which with the exception of the metal hook, is entirely composed of animal matter and thus is rendered more attractive to fish which like the mountain trout, are instinctively discerning.

I attain the above objects by placing around the shank of a fish-hook of ordinary construction, a hollow body of sufficient buoyancy to permanently maintain the hook and other parts connected therewith in a floating condition. The body is preferably made of a piece of quill which is closed at its ends by suitable means. Feathers and other light material are attached to the body to give it the appearance of a winged insect, and the body may if so desired be colored to more closely simulate the fly or other insect it represents.

While any suitable means for closing the ends of the hollow body may be employed within the spirit of my invention, I preferably attain this result by tying the ends of the quill together by means of a gut or other suitable binding material, after the quill has been soaked in warm water to prevent its splitting.

In some instances it has been found advantageous to reinforce the hollow body by a filling of cork or other similar material which supports its wall without materially lessening the buoyancy of the article.

An embodiment of my invention has been illustrated in the accompanying drawings in the various views of which like parts are similarly designated, and in which, The figure is a partially longitudinal section and side view of my invention.

Referring more specifically to the drawings:

In the form shown in the figure, a body 7 of cork or other buoyant material is placed within the quill for the purposes hereinbefore set forth.

The body of the bait may be colored in any suitable manner to more closely simulate the insect it is intended to represent, and it may be applied in connection with a smaller body to represent the head of the insect as shown at 8 in the drawings.

By the term "quill" as used in the specification and claims is meant the hard horny hollow part of any feather.

The hollow body placed around the shank of the hook as hereinabove described, is of sufficient size to provide a water-tight chamber which permanently supports the hook and other parts of the fly in a floating condition upon the surface of the water. The position of the body relative to the hook, causes the fly to float upon the water in a position closely resembling that of the live insect, and the absence of excessively projecting parts aids in the deception and still further adapts the bait for use as a lure for fish.

The use of quill in the production of the body, also adds to its value as a bait since it is a well-known fact that game fish are particularly attracted to animal matter and easily repelled by other substances such as rubber, which have a distinctive foreign odor.

The quill body furthermore is sufficiently elastic and tenacious to withstand the contact of the teeth of the fish and thereby permit of repeated use of the bait to which it is applied.

Having thus described my invention what I claim and desire to secure by Letters-Patent is:

1. In an artificial bait, a water-tight quill forming the body of the bait, and a relatively light material filling and supporting the walls of the quill.

2. In an artificial bait, a quill forming the body of the bait, and means bound about the ends of the quill, gathering it together and closing it at these points.

3. An artificial fly, including a hook, a buoyant hollow body formed of a quill, to support the hook longitudinally in a floatable position upon the surface of a body of water, with its bill submerged beneath said water-surface, said body-forming quill having arranged therein a relatively light filler for supporting the walls thereof, an insect-simulating means applied to said quill, and means bound about, and closing the ends of the quill upon the shank of the hook.

4. An artificial fly, including a hook, a cork-body of oblong outline having the shank of said hook extending therethrough and the point of the hook extending beyond said cork-body the bill of said hook being arranged for submergence, a quill inclosing said cork-body and having its ends secured water-tight around said hook-shank, and an insect-simulating means applied to said quill at its inner end.

In testimony whereof I have affixed my signature in presence of two witnesses.

EDWARD LAFAYETTE COX.

Witnesses:
G. J. ROLLANDET,
L. RHOADES.

Copies of this patent may be obtained for five cents each, by addressing the "Commissioner of Patents, Washington, D. C."